Patented May 19, 1953

2,639,299

UNITED STATES PATENT OFFICE 2,639,299

HALODIETHYLBENZENES

Earl T. McBee, Lafayette, Ind., assignor to Purdue Research Foundation, Lafayette, Ind., a corporation No Drawing. Application December 3, 1943, Serial No. 512,809

7 Claims. (Cl. 260—651)

This invention relates to certain halogenated-alkyl benzenes and is more particularly concerned with the halodiethylbenzenes wherein the hydrogen in the substituting ethyl groups has been entirely replaced with halogen and the total number of fluorine atoms in such groups is at least 8.

I have prepared the halodiethylbenzenes of the group above-mentioned, determined certain of their physical properties whereby they may be identified, and have ascertained that they are particularly useful as heat transfer agents and hydraulic fluids.

Among the compounds included within the scope of my invention are the ortho-, meta-, and para-halodiethylbenzenes in which all of the hydrogen in the substituting ethyl groups has been replaced by chlorine, bromine, iodine, or fluorine and the total number of fluorine atoms in both groups is 8, 9, or 10. The compounds are mobile, water-white liquids at room temperature which boil at moderately elevated temperatures and have relatively low freezing points.

The preparation of the aforementioned compounds may be accomplished by exhaustively halogenating the ethyl side chains of diethylbenzene with a halogen other than fluorine and thereafter replacing all or at least eight of the established halogen atoms with fluorine. The preliminary halogenation may be carried out at moderately elevated temperatures with the use of actinic light. The fluorination of the decahalodiethylbenzenes can be accomplished with hydrogen fluoride in the presence of a catalyst such as antimony pentachloride, antimony trifluoride, et cetera.

The following examples illustrate the practice of my invention, but are not to be construed as limiting the same:

Example 1

Four hundred millimeters (344 grams; 2.57 moles) of technical diethylbenzenes was poured into a chlorination tube made from a 4-foot length of 51 millimeter Pyrex glass tubing. The tube was fitted with a gas dispersion disc, reflux condenser, and a thermometer. Illumination for the reaction was obtained by placing the tube between two banks of incandescent light bulbs. Chlorine was added continuously through the gas dispersion discs in the bottom of the chlorination tube at such a rate that no color of free chlorine was detectable in the upper portion of the reactant. The chlorine was added slowly at first to allow for a short induction period. The reaction mixture was cooled by immersing the lower portion of the tube in an ice bath, in order to prevent the decomposition of the partially chlorinated diethylbenzenes and subsequent polymerization of the resulting olefinic compound. During the first two hours of the reaction, the temperature was maintained in the range between 70° and 80° centigrade. The reaction mixture was then allowed to warm slowly to 120° centigrade and maintained at such temperature for a second two hour period. During this stage in the chlorination the rate of chlorine flow was adjusted so that an excess over that absorbed in the reaction was passed into the reaction mixture. At the end of the fourth hour the temperature of the reaction mixture was allowed to rise slowly to 140° centigrade and then to about 150° centigrade. The total reaction time was approximately fifteen hours.

Dissolved chlorine and hydrogen chloride were removed from the reaction mixture by blowing it with air and the chlorinated diethylbenzenes were poured into a beaker containing 250 milliliters of diethylbenzenes, with stirring and cooling. Stirring was continued for ten hours, the crystalline mass was then filtered, washed free from diethylbenzenes with methyl alcohol, and dried. The yield of decachlorodiethylbenzenes was 65 per cent of theory, based on the weight of diethylbenzenes employed.

The fluorination of the technical mixture of decachlorodiethylbenzenes was carried out with hydrogen fluoride in the presence of antimony pentachloride as follows:

330 grams (0.7 mole) of technical decachlorodiethylbenzenes, 100 grams of antimony pentachloride, and 450 grams (22.5 moles) of hydrogen fluoride were introduced into a one and a half liter nickel-lined autoclave. The autoclave was then heated to a temperature of 270° centigrade and maintained at this temperature for forty-eight hours. The pressure in the autoclave was approximately 4,000 pounds per square inch during the course of the reaction. At the end of the reaction period the pressure was released on the autoclave by bubbling exit gases through a sodium hydroxide solution. The liquid reaction products were washed free of antimony salts with concentrated hydrochloric acid. The product was washed with water, dried over calcium chloride, and rectified. From the reaction product there was thus isolated 28 grams of decafluorodiethylbenzenes, representing a 13 per cent of theoretical yield; 32 grams of monochloro-nonafluorodiethylbenzenes representing a 14 per cent of theoretical yield and, 120 grams of dichlorotetrafluorodiethylbenzenes, representing a 50 per cent of theoretical yield, all based upon the weight of decacholordiethylbenzenes.

Example 2

Pure metadiethylbenzene was chlorinated substantially according to the procedure described in Example 1 for the chlorination of technical diethylbenzenes. Meta - bis - (pentachloroethyl)-benzene was separated from the reaction product, purified with benzene and methanol, and the pure material fluorinated at a temperature of 250° centigrade, substantially in accordance with the fluorination procedure of Example 1. Yields above 90 per cent of metabis-(pentafluoroethyl)-benzene were obtained. The compound boils at 134.5°–135° centigrade at 750 millimeters of mercury pressure absolute. The melting point of the compound is —28.5° centigrade.

By utilizing the same chlorination and fluorinization technique as outlined in Example 1, I have obtained in high yield meta-monochlorotetrafluoroethyl-pentafluoroethylbenzene boiling at 160.6°–161° centigrade at 750 millimeters and melting at —45.5° centigrade; meta-bis-(monochlorotetrafluoroethyl)-benzene boiling at 190°–190.5° centigrade at 752.5 millimeters and melting at —67° centigrade; para-bis-(pentafluoroethyl)-benzenes boiling at 138.5°–139° centigrade at 750 millimeters and melting at 17.1° centigrade; para-monochlorotetrafluoroethyl - pentafluoroethylbenzene boiling at 164.5°–165° centigrade at 750 millimeters and melting at —7.5° centigrade; and para-bis - (monochlorotetrafluoroethyl)-benzene boiling at 193°–194° centigrade and melting at 13.5° centigrade.

The ortho-decahaloethyl benzenes containing a total of 8, 9, or 10 fluorine atoms in the substituting ethyl groups can be prepared in the same fashion by the replacement of chlorine in the side chains of the corresponding chloro compounds. The per-bromo and per-iodo diethylbenzenes may likewise be fluorinated to yield a similar series of compounds.

I claim:

1. A halodiethylbenzene wherein the hydrogen of the substituting ethyl groups has been entirely replaced with halogen and the total number of fluorine atoms in such groups is at least 8.
2. Bis-(monochlorotetrafluoroethyl)-benzene.
3. Monochlorotetrafluoroethyl - pentafluoroethyl-benzene.
4. Bis-(pentafluoroethyl)-benzene.
5. Para-bis-(pentafluoroethyl)-benzene.
6. Meta - monochlorotetrafluoroethyl - pentafluoroethyl-benzene.
7. Meta - bis - (monochlorotetrafluoroethyl)-benzene.

EARL T. McBEE.

No references cited.